No. 832,539. PATENTED OCT. 2, 1906.
G. T. DAVIS.
CONCRETE FENCE POST AND WIRE FENCE.
APPLICATION FILED JULY 11, 1906.
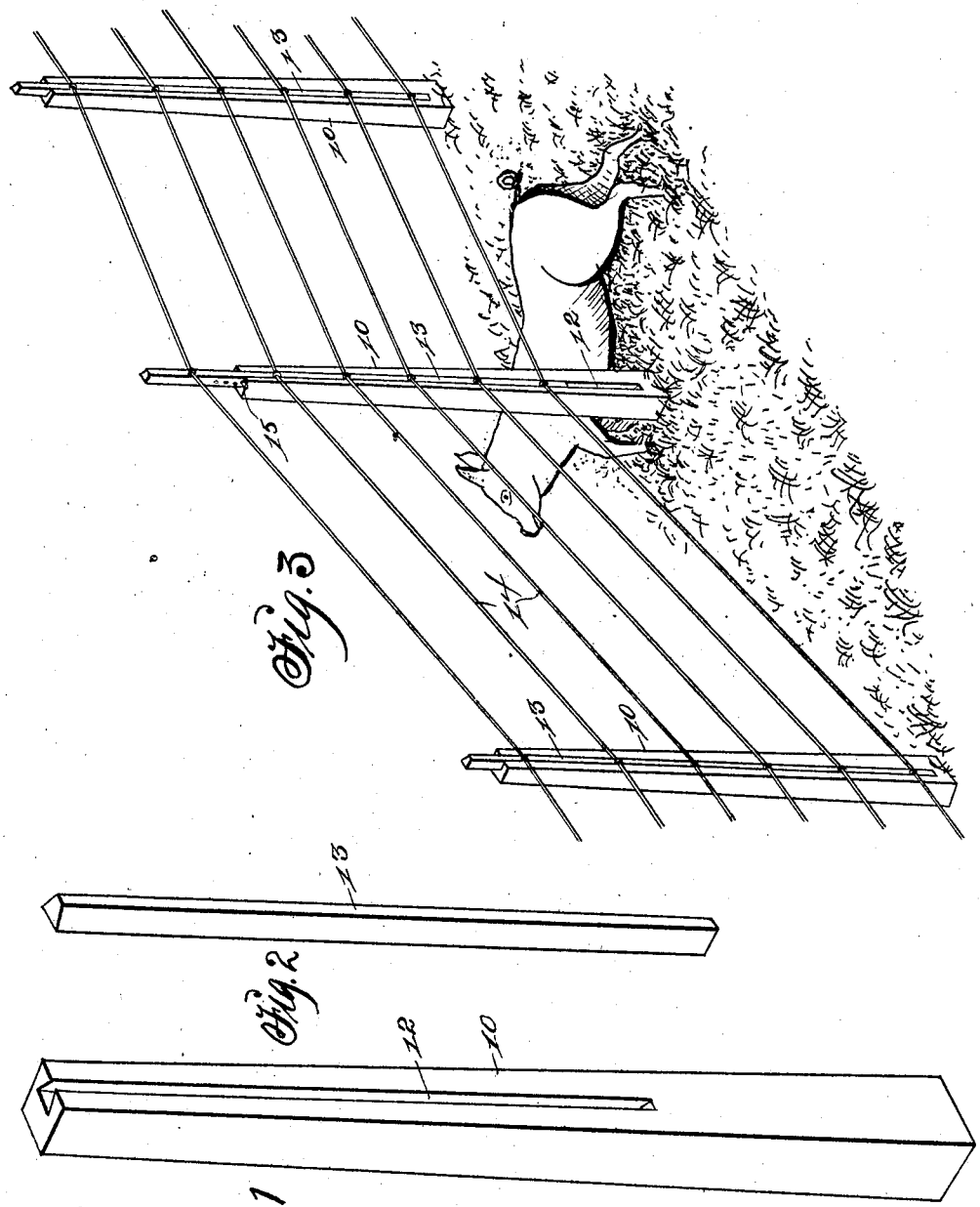

UNITED STATES PATENT OFFICE.

GEORGE T. DAVIS, OF AMES, IOWA.

CONCRETE FENCE-POST AND WIRE FENCE.

No. 832,539.　　　Specification of Letters Patent.　　　Patented Oct. 2, 1906.

Application filed July 11, 1906. Serial No. 325,734.

*To all whom it may concern:*

Be it known that I, GEORGE T. DAVIS, a citizen of the United States, residing at Ames, in the county of Story and State of Iowa, have invented a new and useful Concrete Fence-Post and Wire Fence, of which the following is a specification.

My object is, first, to provide a method and means adapted for detachably connecting a wooden wire-support and fence-wires with a fixed post; second, to raise and lower the wire-support and the wires fixed thereto relative to fixed posts, as required, to allow hogs and other small animals to pass through under the fence from one field to another, while cattle and other large animals are restrained by the fence; third, to detach the wooden wire-supports and the fence-wires fixed thereto from the fixed posts, and rolling them in bundles to facilitate taking down a fence and moving it to a different location or storing it whenever desired.

My invention consists in the arrangement and combination of posts, wooden wire-supports, and fence-wires, as hereinafter set forth, pointed out in my claims, and illustrated in the accompanying drawings, in which—

Figure 1 is a perspective view of a concrete post, and Fig. 2 a perspective of a wooden wire-support adapted to be adjustably and detachably connected with the post. Fig. 3 shows a complete fence and a section thereof elevated, as required, to allow small animals to pass back and forth under the wires from one field to another at pleasure.

The numeral 10 designates a concrete fence-post made of sand and cement in a mold. It may vary in size and weight, as desired. A cavity 12, extending from the top of the post straight down to its lower end portion, is formed in the face of the post, as shown, by placing a core on the bottom of the mold and then tamping the concrete upon it in a common way. Wooden wire-supports 13 are shaped by means of machinery to fit into the cavity 12 in such a manner that they can be raised and lowered and withdrawn at pleasure and when damaged in any way be replaced by a new one. By making the cavities 12 in the posts by means of a core they will be uniform, so the wire-supports 13, also made uniform in size and shape, will be interchangeable in a fence and greatly advantageous in making a fence, repairing it, or moving it.

As shown in Fig. 3, the wire-supports 13 and wires 14 or a length of woven wire fixed to the supports can be readily raised, as shown, to allow small animals to pass under the lower wire at any post in the line of fence.

It is obvious a length of wire fencing composed of plain fence-wires or woven wire may be made and rolled in a bundle for transportation and readily connected with a row of fixed posts in which the cavities 12 are the same distance apart as the supports 13.

It is also obvious that the supports 13 can be first placed in the cavities 12 and the fence-wires then fixed thereto by means of staples.

To facilitate handling the supports 13 and adjusting them up or down in the posts, that are preferably made long enough so their top ends will project above the tops of the post, and to fasten them in elevated position, as shown in the elevated panel in Fig. 3, the supports 13 are provided with apertures through which nails or spikes 15 may be passed, so their ends will rest upon the tops of the posts.

Having thus set forth the purposes of my invention and the manner of making and combining posts and wire-supports for fixing wires thereto, the practical use and utility of the invention will be obvious to farmers and others.

What I claim as new, and desire to secure by Letters Patent, is—

1. In a wire fence the combination of fixed concrete fence-posts having openings in their side faces of dovetail shape in cross-section extending from the tops to their lower end portions, wooden wire-supports fitted in the openings and extended above the tops of the posts and means for fastening the wooden wire-supports at different points of elevation relative to the posts, as set forth.

2. In a wire fence the combination of concrete posts having cavities in their side faces as shown, wooden wire-supports fitted in the cavities and provided with transverse holes in their upper end portions extending above the posts, fence-wires fixed to the wooden supports and spikes in the holes of the wooden wire-supports, as shown and described to operate as set forth.

GEORGE T. DAVIS.

Witnesses:
　F. B. O'BRIEN,
　M. C. KOOSER.